(12) United States Patent
Whitcomb et al.

(10) Patent No.: US 8,082,171 B1
(45) Date of Patent: Dec. 20, 2011

(54) METHODS AND SYSTEMS FOR HOSTING BUSINESS APPLICATIONS HAVING PIPELINE-BASED BUSINESS LOGIC USING SHARED COMPUTING RESOURCES

(75) Inventors: Wayne Whitcomb, North Hampton, NH (US); David C. Boyle, Atkinson, NH (US); Ulrike Mueller, Boston, MA (US); Stephan Stamback, Concord, MA (US)

(73) Assignee: Demandware Inc., Burlington, MA (US)

( * ) Notice: Subject to any disclaimer, the term of this patent is extended or adjusted under 35 U.S.C. 154(b) by 1514 days.

(21) Appl. No.: 11/498,592

(22) Filed: Aug. 3, 2006

Related U.S. Application Data

(60) Provisional application No. 60/706,128, filed on Aug. 4, 2005.

(51) Int. Cl.
*G06F 17/00* (2006.01)
(52) U.S. Cl. .................................................. 705/7.38
(58) Field of Classification Search .................. 705/7.38
See application file for complete search history.

(56) References Cited

U.S. PATENT DOCUMENTS

| | | | |
|---|---|---|---|
| 6,760,711 | B1 | 7/2004 | Gillett et al. |
| 6,847,995 | B1 | 1/2005 | Hubbard et al. |
| 6,879,965 | B2 | 4/2005 | Fung et al. |
| 2003/0120560 | A1 | 6/2003 | Almeida |
| 2004/0064548 | A1* | 4/2004 | Adams et al. ................ 709/224 |
| 2005/0188180 | A1* | 8/2005 | Illmann ........................ 712/216 |
| 2007/0011437 | A1* | 1/2007 | Carnahan ..................... 712/200 |

OTHER PUBLICATIONS

Compare GoECart with other Shopping Carts. Retrieved from http://www.goecart.com/shopping_cart_software_comparison.asp on Apr. 4, 2005.
Secure Ecommerce Hosting & Scalable Network Infrastructure. Retrieved from http://www.goecart.com/ecommerce-hosting.asp on Apr. 4, 2005.
Shopping Cart Software Price for GoECart Ecommerce Solution. Retrieved from http://www.goecart.com/shopping_cart_software_price.asp on Apr. 4, 2005.
FAQ's-Ecommerce Solution, Shopping Cart Software Solution. Retrieved from http://www.goecart.com/ecommerce_faqs.asp on Apr. 4, 2005.
Maynard et al. Merrill Lynch Software Goes on Demand. 16 pgs. (Feb. 10, 2004).

* cited by examiner

*Primary Examiner* — Thomas Dixon
(74) *Attorney, Agent, or Firm* — Ropes & Gray LLP

(57) ABSTRACT

Methods and systems for hosting business and other e-commerce application services are provided which provide secure shared computing resources to multiple instances of e-commerce or other business applications. The shared computing resources are dynamically allocated among the instances of the applications, and the instances of the applications are logically separated from one another to provide additional security.

32 Claims, 11 Drawing Sheets

METHODS AND SYSTEMS FOR HOSTING BUSINESS APPLICATIONS HAVING PIPELINE-BASED BUSINESS LOGIC USING SHARED COMPUTING RESOURCES

CROSS REFERENCE TO RELATED APPLICATIONS

This application claims the benefit of priority of U.S. Provisional Application No. 60/706,128 filed Aug. 4, 2005, the disclosure of which is incorporated herein by reference in its entirety.

FIELD OF THE INVENTION

In general, the application relates to methods and systems for hosting e-commerce and other business software applications. More particularly, the application relates to methods and systems for hosting e-commerce and other business applications on a hosting system providing shared computing resources which are dynamically allocated among instances of the hosted applications.

BACKGROUND OF THE INVENTION

Traditionally, e-commerce vendors have had three options for hosting their websites. First, vendors could own and operate their own hosting equipment and software. This option burdens the vendor with the hardware costs as well as the costs of maintaining an information technology staff to maintain and support the website.

As an alternative, vendors have leased dedicated resources from remote hosting services, relying on the services' information technology staff to keep the website up and operational. This option reduces the burden on the vendor to hire and maintain its own information technology staff. However, this option limits the ability of the vendor to dynamically allocate computer resources to its website based on changing resource demands. Thus, vendors often have to lease more computing power than they normally need to be prepared for contingencies. This second option also generally limits the vendors' ability to modify the websites hosted on the remote equipment.

Other vendors have chosen to lease hosting services from providers of shared hosting services. These services host multiple vendors' websites on a single system. To preserve the security of such systems, their operations usually limit the functionality of the hosted application. The operator also limits the level of customization they provide to their customers so that no customer's customization inadvertently interferes with the operation of another customer's application.

SUMMARY OF THE INVENTION

Thus e-commerce vendors have a need for a secure, remote, flexible e-commerce hosting system that can provide computing resources on demand, and which does not overly limit the vendors' ability to control and modify the vendors' websites. To this end, in one aspect, the invention described herein relates to a method for providing an e-commerce hosting service which includes operating a hosting system which provides shared computing resources, such as network bandwidth, memory, or processor time, to a plurality of instances of an e-commerce application. Each instance of the e-commerce application includes a corresponding business logic and graphical user interface. The method also includes providing remote access to a design tool for modifying the business logic and the graphical user interface corresponding to at least one of the plurality of instances. The hosting service monitors the demand for the shared computing resources of the plurality of instances and dynamically reallocates the resources accordingly.

In one embodiment, the design tool includes a graphical user interface for enabling a vendor to modify the business logic and the graphical user interface of at least one of the plurality of instances of the e-commerce application. The design tool includes its own graphical user interface which allows for the dragging and dropping of modularized sequences of software code (source code or object code), referred to as pipelets, into business logic pipelines. One feature of the design tool is that it includes an expandable library of selectable business logic components, including pipelines and pipelets, from which a vendor can build or modify its website. The hosting system, in one embodiment, also includes a plurality of application program interfaces for integrating one of the instances of the e-commerce application with an application operating a separate computer network.

The hosting system, itself, in one embodiment includes a plurality of servers. Each of the servers includes computing resources which are shared among the instances of the e-commerce applications. The hosting system can execute a given instance of the e-commerce application on one or more servers at the same time. In one embodiment, the servers are configured to operate as a grid. An additional feature of the hosting system is that it isolates individual instances of the e-commerce application from other instances of the e-commerce application, whether the instances are executing on the same or different servers.

In a second aspect, the invention relates to a e-commerce hosting system including a plurality of servers which share computing resources, and which execute a plurality of instances of e-commerce applications. Each e-commerce application has a corresponding business logic and a corresponding graphical user interface. The e-commerce hosting system also includes a remote access design tool for modifying the business logic and the graphical user interface corresponding to one of the plurality of instances. In addition, the hosting system includes a resource management module for monitoring the demand of the instances of the e-commerce application and allocating the computing resources of the servers based on the observed demand.

In a third aspect, the invention relates to a method of providing a business software application hosting service. The method includes operating a hosting system which provides shared computing resources to a plurality of instances of a business software application. Each instance of the business software application has a corresponding business logic and graphical user interface. The method also includes providing remote access to a design tool for modifying the business logic and the graphical user interface corresponding to one of the plurality of instances of the business software application. The hosting system allocates the shared computing resources among the plurality of instances of the business software application. Furthermore, the method includes logically isolating the shared computing resources allocated to a each of a plurality of instances of the business software application from the shared computing resources allocated to a remainder of the instances of the business software application.

BRIEF DESCRIPTION OF THE DRAWINGS

The system and methods may be better understood from the following illustrative description with reference to the following drawings in which.

DESCRIPTION OF AN ILLUSTRATIVE EMBODIMENT

To provide an overall understanding of the invention, certain illustrative embodiments will now be described, including methods and a system for providing hosting services for e-commerce and other business applications. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
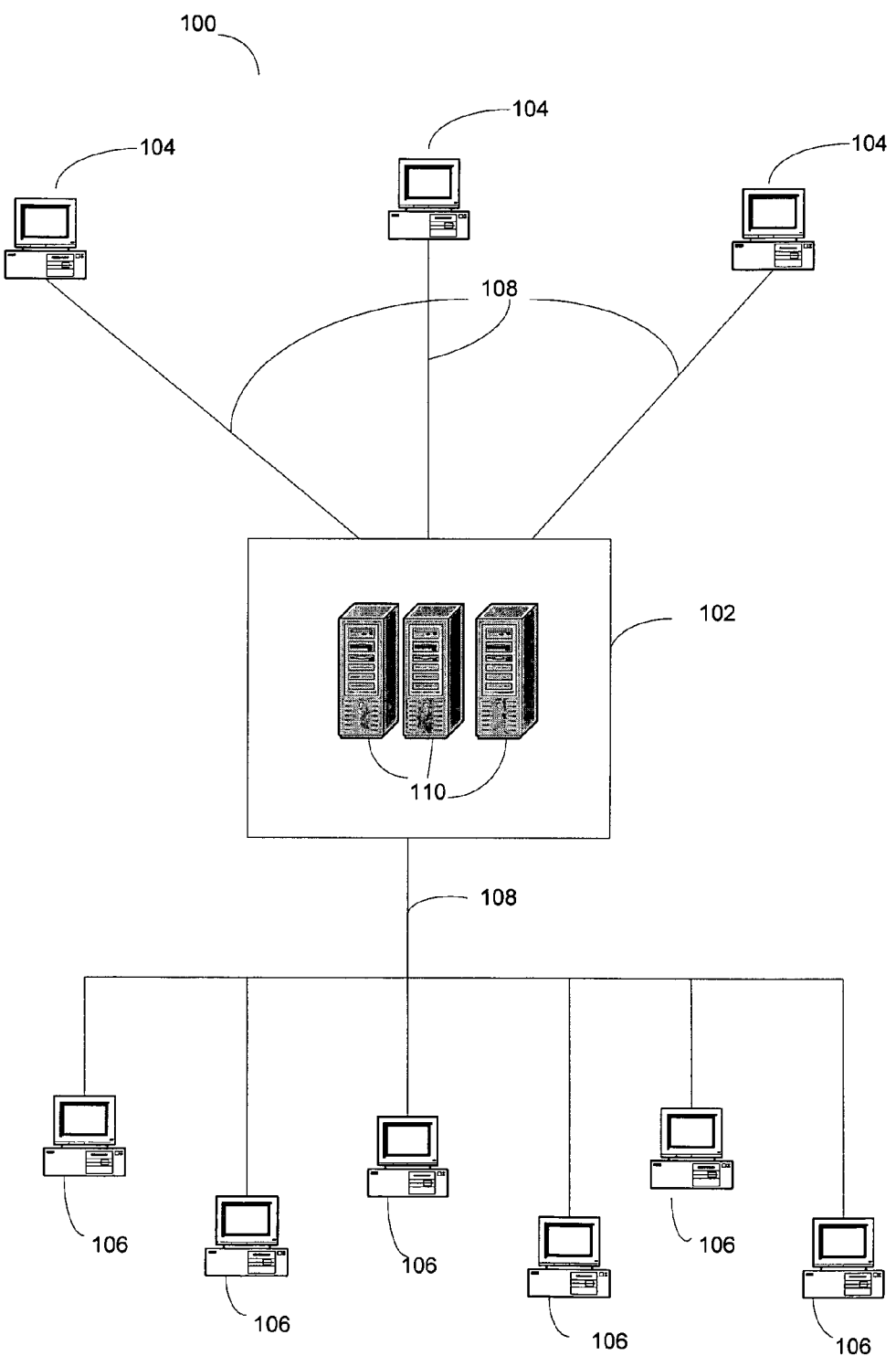
FIG. 1 is a conceptual diagram of a computer network including a e-commerce hosting system, according to an illustrative embodiment of the invention.

FIG. 1 is a conceptual diagram of a computer network 100 including an e-commerce hosting system 102, according to an illustrative embodiment of the invention. The computer network 100 includes e-commerce vendor computers 104, the e-commerce hosting system 102, and customer computers 106. The hosting system 102, vendor computers 104, and the customer computers 106 are interconnected by way of a computer network 108, such as the Internet.

The e-commerce hosting system 102 includes multiple servers 110. The servers 110 may be co-located in a single location, or they may be geographically dispersed and networked together. In one implementation, the e-commerce hosting system 102 includes at least one group of servers in a single server rack to minimize the physical real estate needed to operate the e-commerce hosting system 102. The e-commerce hosting system 102 operates the computers in a grid configuration. The grid configuration and related features are described further below in relation to FIGS. 4-6.

Vendors sell goods and services to customers over the computer network 108. Each vendor operates at least one website or other electronic storefront (collectively "websites") made available to customers via the e-commerce hosting site. Vendors may operate additional computer software on the vendor computers 104 local to the vendor for supporting other aspects of their business not supported by the e-commerce hosting system 102.

Figure 2:
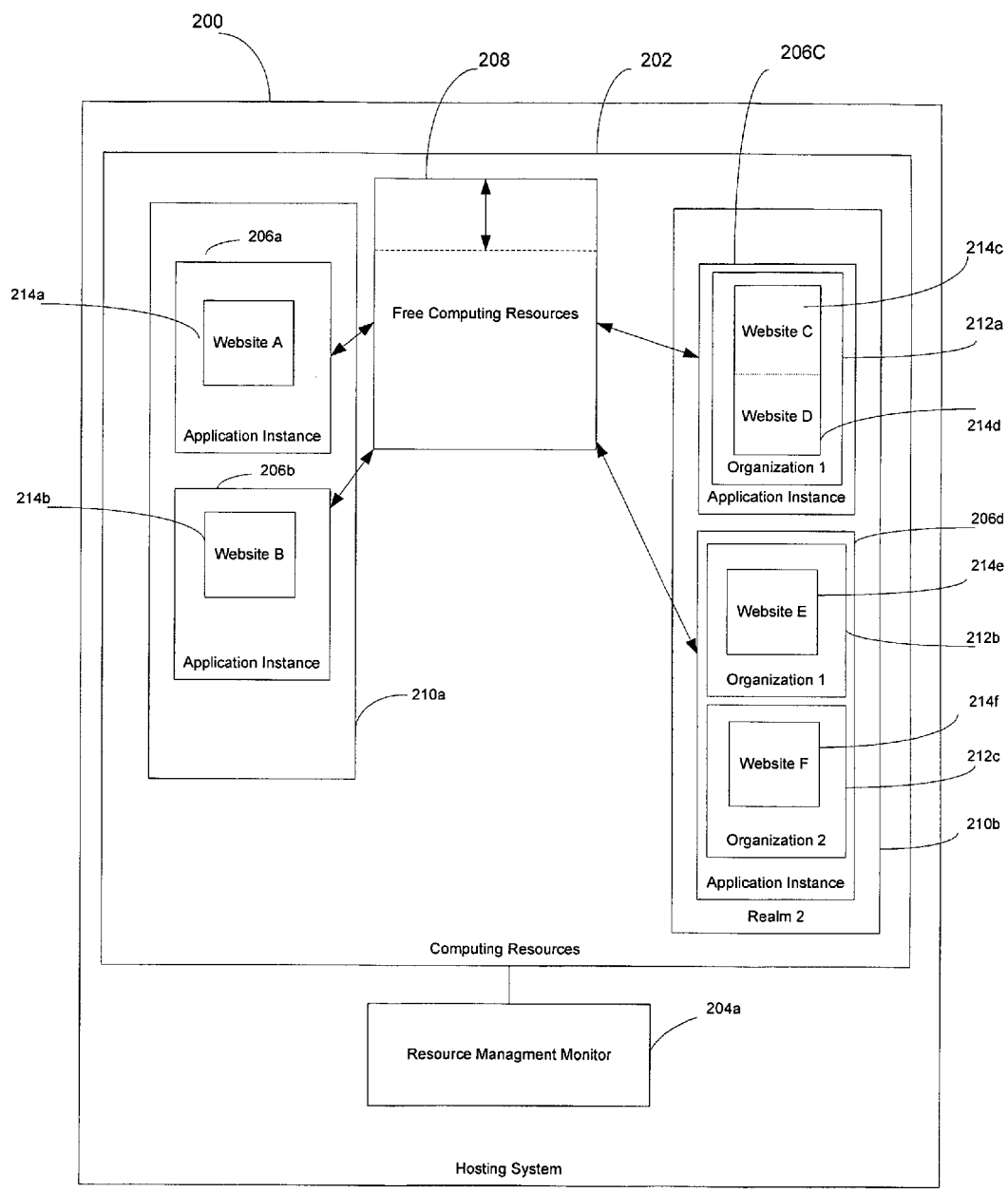
FIG. 2 is a block diagram depicting the e-commerce hosting system of FIG. 1, according to an illustrative embodiment of the invention.

FIG. 2 is a conceptual block diagram of an e-commerce hosting system 200, such as the e-commerce system 102 of FIG. 1, according to an illustrative embodiment of the invention. The e-commerce hosting system 200 includes computing resources 202 and a resource management module 204. The computing resources 202 include, without limitation, network bandwidth, processor cycles, software applications, storage, and memory. The computing resources 202 are allocated to several e-commerce application instances 206a-206d (generally "instances 206"). The depiction of only four instances 206 is merely illustrative. The e-commerce hosting system 200 may operate fewer than, or more than four instances 206, limited by e-commerce vendor demand and the availability of sufficient computing resources 202. Computing resources 202 not allocated to a particular instance 206a-206d are kept in reserve as free computing resources 208.

The instances 206a-206d are grouped into vendor-specific realms 210a and 210b (generally "realms 210"). Vendors may operate multiple instances 206 within a given realm 210. For example, Realm 1 210a includes two instances 206a and 206b. Within each instance 206, a vendor can create one or more organizations 212 for which the e-commerce vendor can operate one or more websites 214. For example, a single e-commerce vendor, such as GAP, INC.™, which sells under multiple brands, i.e., GAP™, BANANA REPUBLIC™, and OLD NAVY™, can create a separate organization 212 for each brand, and then set up one or more websites 214 for each brand. Referring specifically to FIG. 2, Realm 2 210b includes two instances 206c and 206d. Instance 206c includes a single organization 212a. Organization 212a includes two websites, Website C 214c and Website D 214d. Instance 206d includes two organizations 212b and 212c. Each organization 212b and 212c includes a single website, Website E 214e and Website F 214f.

Instances 206 in one realm 210 are logically isolated from instances 206 in other realms. In addition, as described further with respect to FIG. 3, some instances 206 within a realm 210 are logically isolated from other instances 206 in the same realm 206. That is, the e-commerce hosting system 200 prevents logically isolated application instances 206 from communicating with other application instances 206. In addition, no instance 206 can access the computing resources allocated to a different instance from which it is logically isolated. The e-commerce hosting system implements the isolation using a combination of techniques. For example, the e-commerce system can implement routing filters and restrict communication between users and the e-commerce system to secure communications such as HTTPs, or WebDAVs protocols. As described further below, the e-commerce system includes web servers, application servers and database servers. To provide further isolation, the e-commerce system restricts user access to underlying foundation applications on these servers. For example, users are barred from directly accessing the Apache™ web server operating on web server, the Tomcat™ java application server operating on the application server, or the Oracle™ relational database management system operating on the database server. Each user's application instance communicates between respective servers over a separate user-specific virtual LAN. Additional or alternative isolation features can be implemented to yield a similar effect. The isolation prevents an instance 206 from interfering with, or accessing data used by any other instance from which it is isolated.

The resource management module 204 dynamically allocates free computing resources 208 between the instances 206a-206d. The free computing resources 208 may include computing resources of a server whose computing resources are not fully utilized or a server maintained as a backup server, substantially all of whose computing resources are being kept in reserve in case of the failure of another server.

The resource management module 204 is implemented in software code, written, for example, in JAVA, C, C++, or another high-level computing language. Alternatively, the resource management module 204 may be partially or completely implemented in hardware as an application specific processor (ASP), a digital signal processor (DSP), or other form of integrated circuit. The resource management module 204 monitors the computer resource usage of the application instances 206a-206d. If the resource management module 204 determines that one of the application instances 206a-206d would benefit from additional computing resources 202 to operate efficiently, the resource management module 204 allocates additional computing resources 202 to the application instance 206. The reallocated computing resources 202 may be provided from the free computing resources 208, or the resource management module 204 may de-allocate resources from another instance 206a-206d that no longer needs as much computer resources 202 to operate efficiently. Further examples of such allocation are described in relation to FIGS. 6 and 7.

Figure 3:
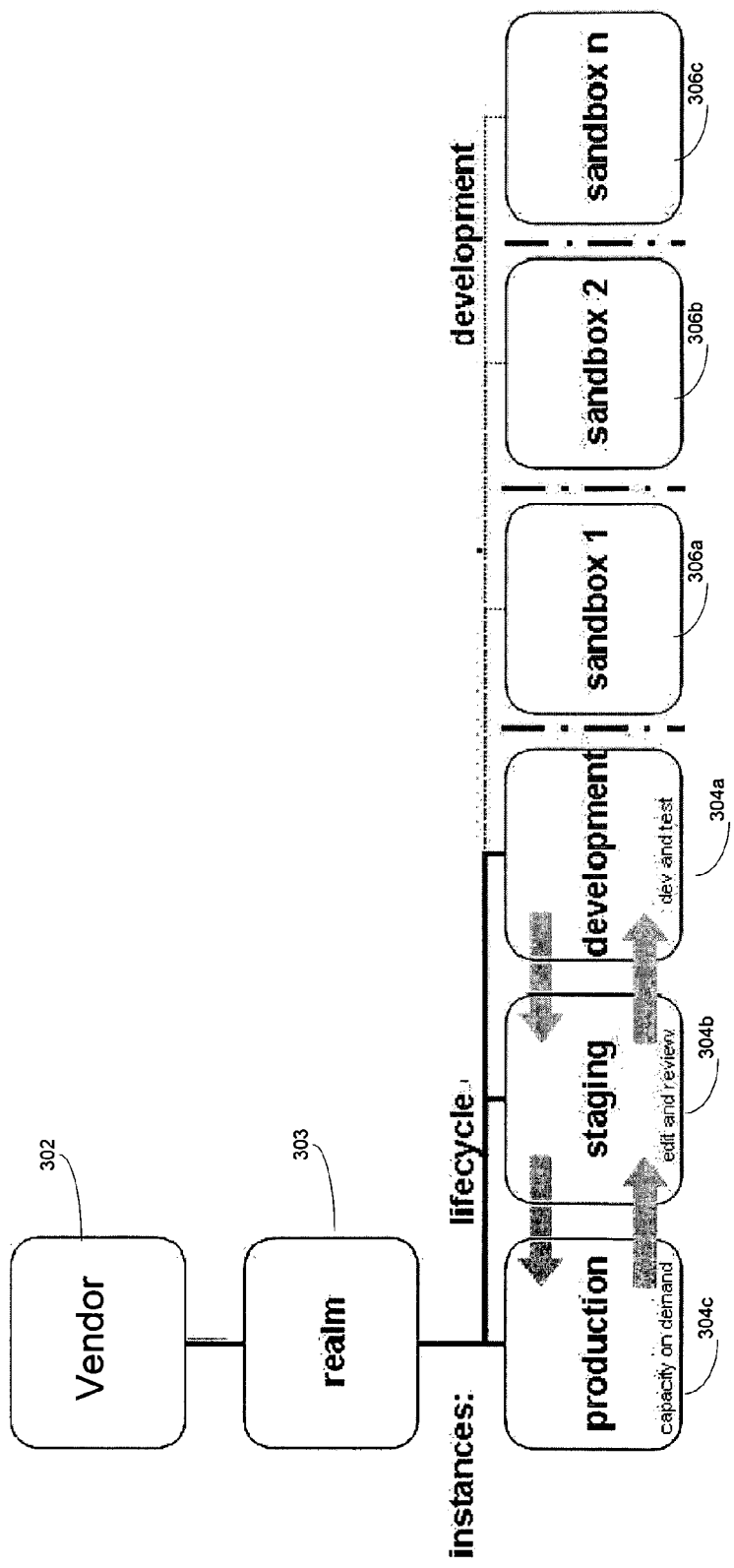
FIG. 3 is a conceptual block diagram of vendor realm on the e-commerce hosting system of FIGS. 1 and 2.

FIG. 3 is a conceptual block diagram of realm usage 300 according to an illustrative embodiment of the invention. As described above in relation to FIG. 2, a vendor can operate multiple instances 206 in a given realm 210. In one illustrative embodiment, a vendor 302, for each realm 303 utilizes one or more lifecycle application instances 304a-304c ("lifecycle instances"), as well as optional development application instances 306a-306c ("development instances"). The e-commerce hosting system 200 allows limited communication among the lifecycle instances 304a-304c within a given realm, unlike the remainder of the instances 206. Lifecycle instances 304a-304c handle the various stages of website development and website operation for a vendor. The development lifecycle instance 304a provides initial development functionality for a website. The staging lifecycle instance 304b provides editorial and review functionality. The production lifecycle instance 304c provides actual operation functionality.

More particularly, after a vendor initially develops and tests a website and its underlying business logic in the development lifecycle instance 304a, the vendor transfers the developed website to the staging lifecycle instance 304b for further review. Once a vendor is sufficiently satisfied with the website, the website is put into operation by transferring it to the production lifecycle instance 304c. Websites in the production lifecycle instance 304c are made available to customers and to the resource demand module 204 of FIG. 2. Thus, once a website is operating in a production lifecycle instance 304c, the resource demand module 204 dynamically allocates computing resources 202 to the website as computing resources are needed. If during operation, the vendor decides that minor changes need to be made to the website or its underlying business logic, the vendor can further revise the website in the staging lifecycle instance 304b. Upon completion of the revisions, the revised website can be passed to the production lifecycle instance 304c thereby updating the website viewed by vendor customers.

Development instances 306a-306c within a realm are logically isolated from other instances 206 within the realm. They provide a vendor the option of designing more drastic changes to its operational websites or their underlying business logic without concern for corrupting the operational website. After the vendor is satisfied with the changes, the website or business logic developed in isolation can be transferred to one of the lifecycle instances 304a-304c.

Figure 4:
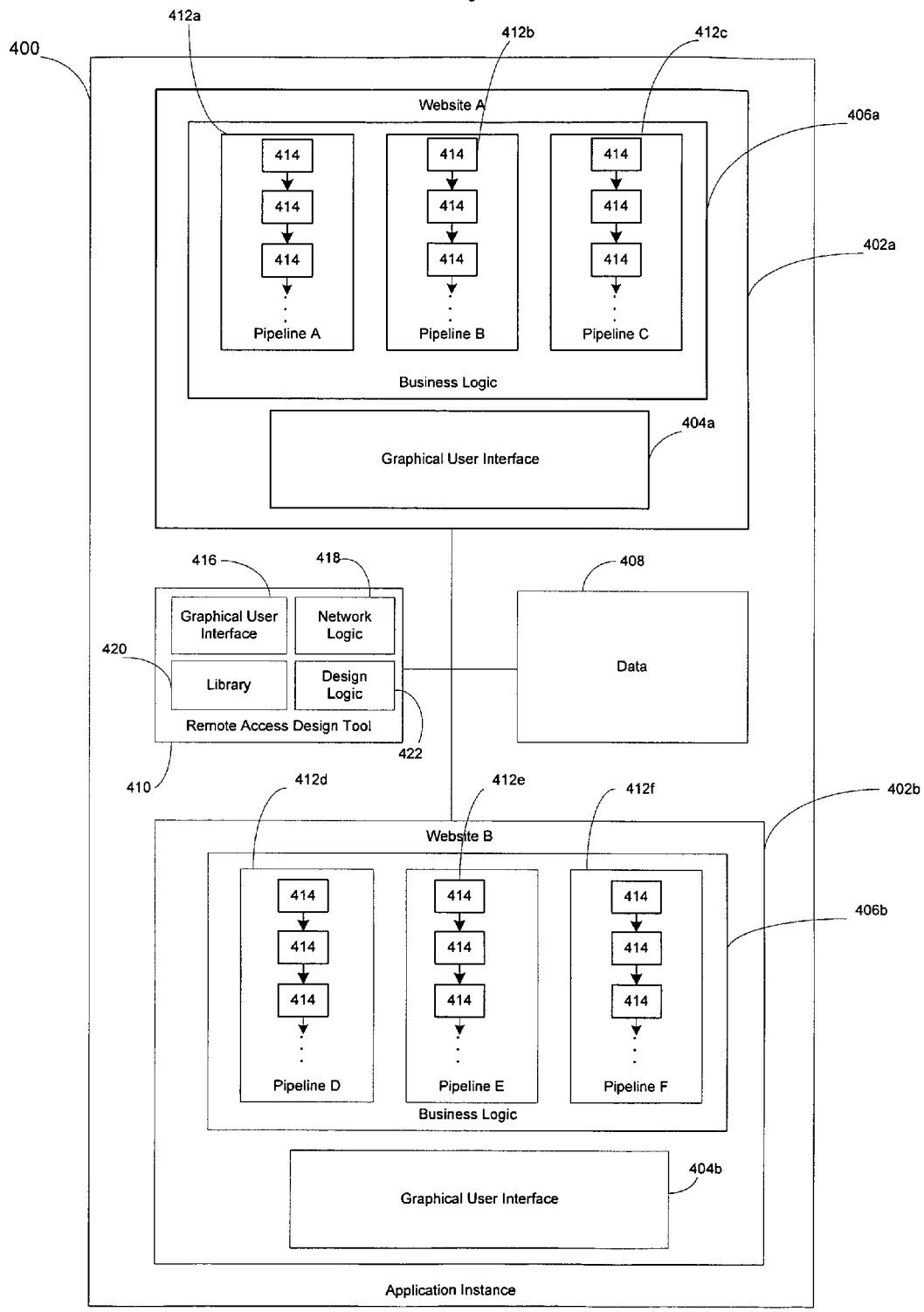
FIG. 4 is a block diagram of an application instance, such as the application instances of FIG. 2 and FIG. 3, according to an illustrative embodiment of the invention.

FIG. 4 is a block diagram of an e-commerce application instance 400 ("instance 400"), such as instance 206, 304, and 306. The e-commerce application, of which instance 400 is an instance of, in one implementation, is a commercially available stand alone e-commerce application adapted for use in an e-commerce hosting system such as the e-commerce hosting systems 102 and 200 of FIGS. 1 and 2. Thus, the adapted e-commerce application provides the features of a traditionally stand-alone product to multiple users. In the e-commerce hosting systems 102 and 200, the instances 206, 304, and 306 are instances of a modified e-commerce software suite provided by INTERSHOP COMMUNICATIONS AG™, headquartered in Jena, Germany.

The instance 400 supports two websites 402a and 402b (generally "websites 402"). The instance 400 includes a graphical user interface 404a and 404b (generally "graphical user interface 404") and business logic 406a and 406b (generally "business logic 406") for each website 402a and 402b. The instance 400 also includes a data store 408. In one implementation, the websites 402a and 402b share a data store 408. In alternative implementations, the instance 400 includes a separate data store 408 for each website 402a and 402b. The instance 400 further includes a remote access design tool 410 for modifying the graphical user interfaces 404a and 404b and the business logic 406a and 406b.

The graphical user interfaces 404 provide the sensory (e.g., graphical, audio, or video) aspects of the websites 402. For example, a website 402 graphical user interface 404 includes static layouts of images, video, and text. The graphical user interface 404 also includes support for animated or dynamic user interfaces provided by a website 402.

In contrast, business logic 406 governs the actual flow of web pages a customer views as the customer navigates a website 402. For example, if a webpage includes a dynamic link based on data input by a customer or based on information stored in a cookie on the customer's computer, the business logic 406 processes the data to determine the appropriate destination of the link. The business logic 406 may also determine the content to be displayed on the destination web page. Sample business logic elements may include, without limitation, product catalog searching and presentation, auction logic, sales tax calculation, credit card processing, and address verification.

More particularly, the business logic 406 includes multiple pipelines 412, each corresponding to a given business logic. The first website 402a includes pipelines 412a-412c. The second website 402b includes pipelines 412d-412f. Each pipeline 412 is further made up of modularized sequences of software code referred to as pipelets 414. For example, the business logic 406a of website 402a includes an order processing pipeline 412a. The order processing pipeline 412a governs the process the website 402a undertakes when a customer selects a product to buy. To carry out the process, the order processing pipeline 412a includes a pipelet 414 for receiving an identification of an order, including a product type and a quantity. Another pipelet 414 in the order processing pipeline 412a confirms whether the vendor has a sufficient quantity of the product in its inventor to satisfy the order. If the vendor has sufficient inventory, another pipelet 414 directs the e-commerce hosting service to transmit a customer data input webpage to the customer into which a customer can enter his or her shipping and billing addresses and credit card information. Another pipelet 414 takes the entered information as input and generates a communication to a third party credit card verification service to process the received information. Upon verification, another pipelet 414 dynamically generates a receipt webpage based on the order and instructs the e-commerce hosting site to transmit the webpage to the customer. Lastly, a final pipelet 414 generates and transmits a communication to the vendor's warehouse computer system to execute the order.

The remote access design tool 410 provides the vendor the ability to remotely modify both the graphical user interfaces 404 and the underlying business logics corresponding to supported websites 402. The remote access design tool 410 includes its own graphical user interface 416 for modifying graphical user interfaces 404 and business logic 406 (described further below in relation to FIGS. 8-11), network logic 418 for providing the vendor access to the application instance 400 from a remote location outside of the network of the e-commerce hosting system, a library 420, including predefined business logic elements from which a vendor can build its business logic 406, and design logic 422 for allowing the vendor to construct or modify business logic 406 by either utilizing business logic elements stored in the library 420 or by generating its own unique business logic elements.

Figure 5:
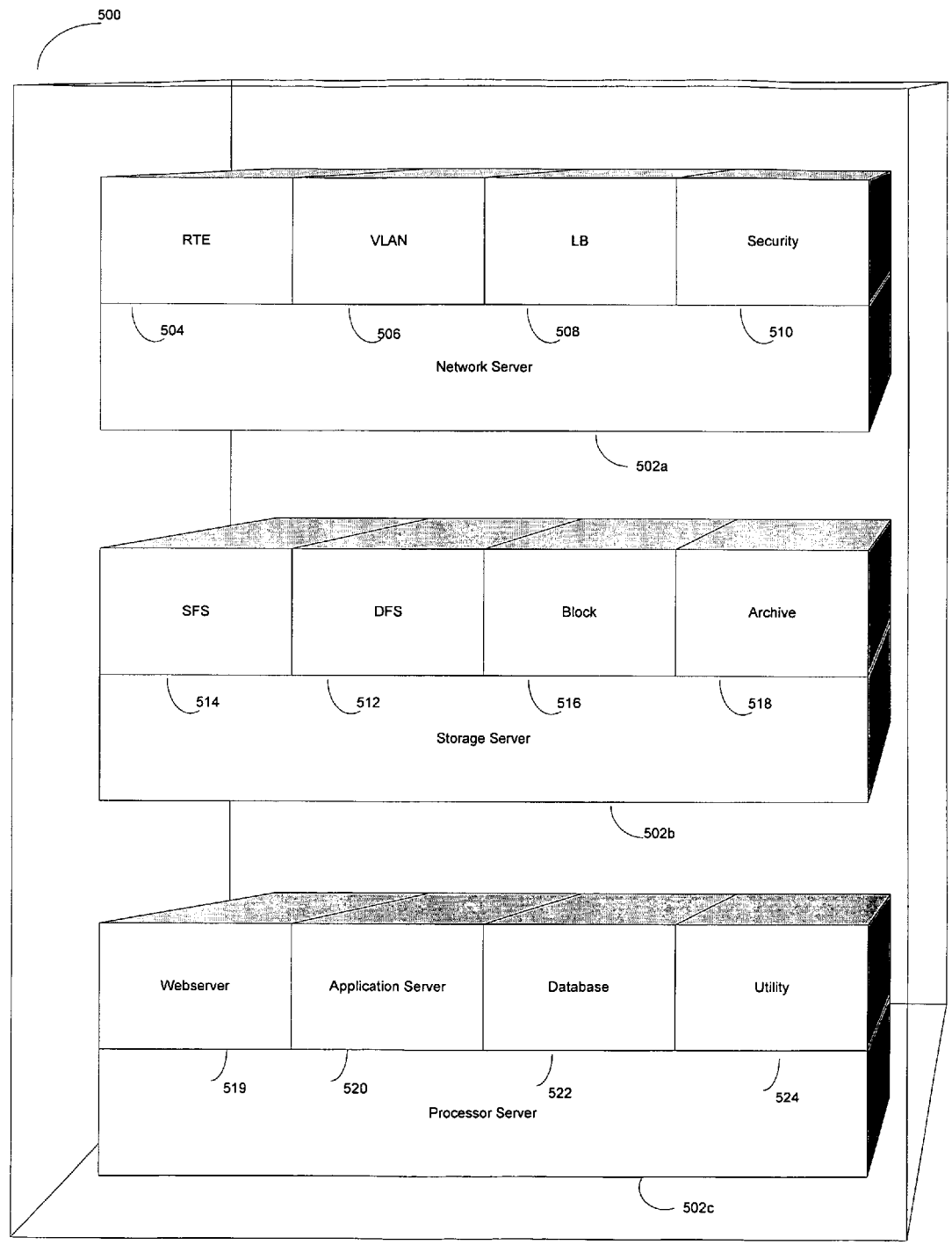
FIG. 5 is a conceptual diagram of a plurality of servers incorporated into the e-commerce hosting system of FIGS. 1 and 2, according to an illustrative embodiment of the invention.

FIG. 5 is a conceptual diagram 500 of a plurality of servers 502a-502c (generally "servers 502") incorporated into the e-commerce hosting system 200 of FIG. 2, according to an illustrative embodiment of the invention. Server 502a (the "network server 502a") primarily provides a set of network functions. Server 502b provides mainly a set of storage functions (the "storage server 502b"). Sever 502c provides mainly a set of processor intensive functions (the "processor server 502c"). In one implementation, the e-commerce hosting system 200 may include one or more of each such server 502a-502c. For example, the e-commerce hosting service 200 may include one or more network servers 502a for each function or groups of functions included in the set of network functions. Similarly, the e-commerce hosting service 200 may include one or more storage servers 502b or processor servers 502c for each function or groups of functions from the set of storage and processor intensive functions. In alternative implementations, the e-commerce hosting system 200 includes one or more servers 502 which each provide a combination of network, storage, or processing functions.

The e-commerce hosting system 200 may also include one or more backup servers 502 which may be substituted for servers 502a-502c that become temporarily disabled as a result of planned maintenance or server 502 failure. In implementations of the e-commerce hosting system 200 that include several distinct server classes, such as the network servers 502a, storage servers 502b, and application servers 502c, the e-commerce hosting system 200 may include backup servers optimized for replacing each particular class of server 502a-502c. Alternatively, the e-commerce hosting system 200 includes backup servers which are capable of replacing any of the servers 502a-502c should one cease functioning. In still other implementations, the e-commerce hosting system 200 operates without backup servers. In such implementations, upon failure of a server, the processes being executed on the failed server are transferred to other servers having free computing resources.

More particularly, the network servers 502a, in one implementation, provide the following set of functions: secure remote administration 504, virtual local area network functionality 506, load balancing 508, and network security (e.g., SSL encryption) 510. The storage servers 502b support Dedicated File System (DFS) storage 512, Shared File System (SFS) storage 514, raw block level storage 516, and archival storage 518. The processing server 502c provides web server functionality 519, application server functionality 520 (e.g., executing the instances 206), database functionality 522, and general utility functionality 524. In alternative implementation the servers 502 may provide additional, fewer, or different functions as appropriate to the particular implementation.

The servers 502 of the e-commerce hosting system 200 are configured to operate as a pool of computing resources, for example, in a grid computing configuration. That is, the servers are virtualized as a single computer, allowing their corresponding computing resources to be shared among the various applications the e-commerce system 200 supports. Grid computing allows unused computing resources on one physical server to add a process that joins the processing of an application instance running on other servers. Servers can be programmed to operate together as a grid using readily available software and protocols, such as the Open Grid Services Architecture (OGSA) developed by the GLOBUS™ Alliance, an international collaboration that conducts research and development to create fundamental Grid technologies. The OGSA is described in further detail in "The Physiology of the Grid: An Open Grid Services Architecture for Distributed Systems Integration" by Foster, et al. available at http://www.globus.org/alliance/publications/papers/anatomy.pdf, the entirety of which is hereby incorporated by reference.

Figure 6A:
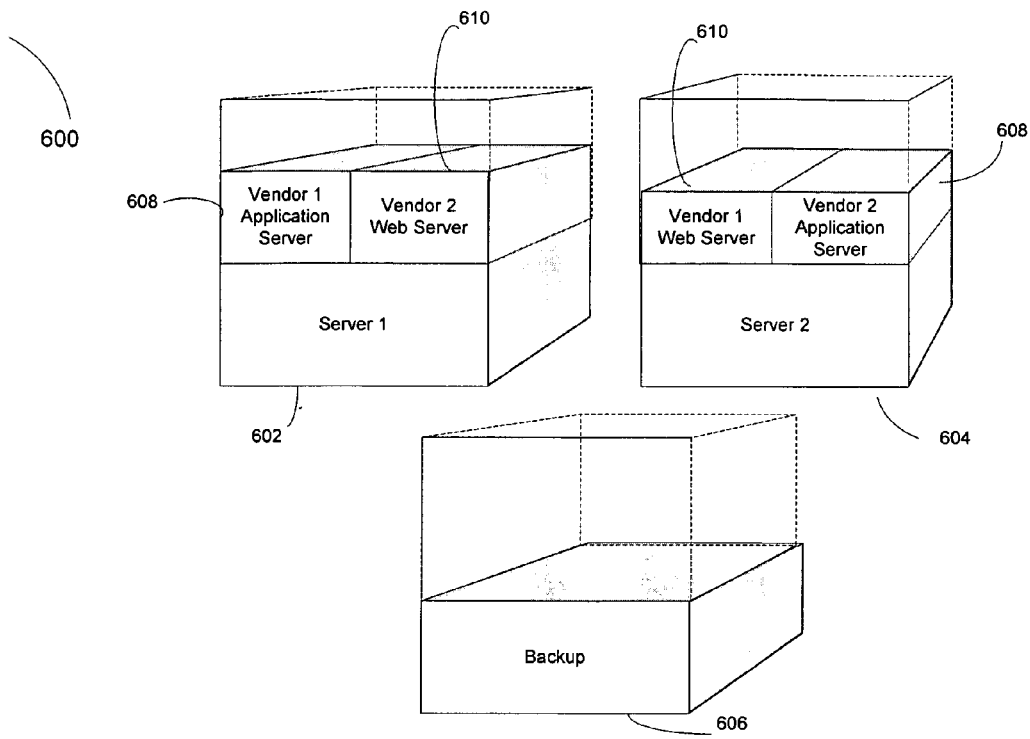
FIGS. 6A and 6B illustrate a first computing resource allocation feature provided by the e-commerce hosting system of FIGS. 1 and 2, according to an illustrative embodiment of the invention.
Figure 6B:
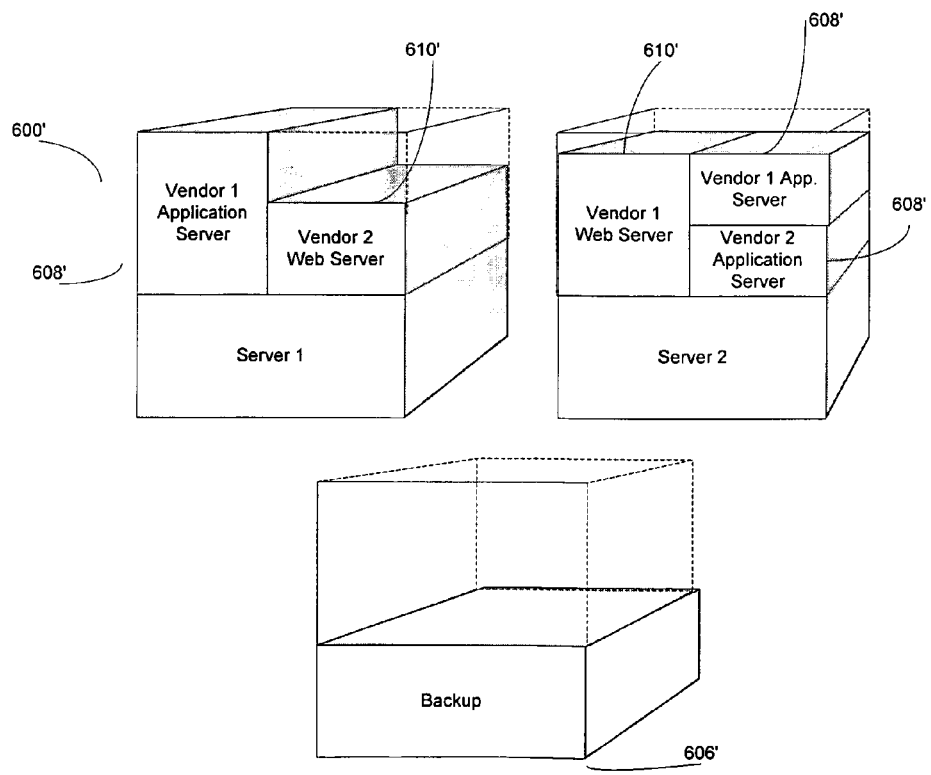

Referring to FIG. 6A, 6B, and back to FIG. 2, FIGS. 6A-6B provide a conceptual depiction of a first resource reallocation functionality of the e-commerce hosting system 200, according to an illustrative embodiment of the invention. FIG. 6A depicts a first allocation 600 of computing resources 202 between two vendors. The first resource allocation 600 includes computing resources 202 provided by two processing servers 602 and 604 and a backup server 606. The wire frame visible over each server 602 and 604 corresponds to the overall computing resources 202 the corresponding processing server 602 or 604 has to offer. Processing server 602 provides application server functionality 608 to a first vendor and web server functionality 610 to a second vendor. Processing server 602 is using about 60% of its computing resources. Processing server 604 provides web server functionality 610 to the second server and application server functionality 608 to the first vendor.

FIG. 6B illustrates a second resource allocation 600' between the two vendors resulting from resource management module 204 detecting that the first vendor has experienced a marked increase in its demand for application server functionality 608 and a smaller increase in its demand for web server functionality 610. As a result, processing server 602' has increased its computing resources 202 utilization to about 80% of its total available computing resources 202 to handle the first vendor's increase in demand for application server functionality 608'. In addition, processing server 604' has allocated additional computing resources 202 to handle the increase in the first vendor's demand for web server functionality 610. It has also begun providing computing resources 202 to provide application server functionality 608 to the first vendor.

In response to the resource management module 204 detecting a subsequent decline in the first vendor's demand for computing resources 202, the resource management module 204 reallocates computing resources 202 away from the first vendor either to another vendor, or to the pool of free computing resources 208.

Figure 7A:
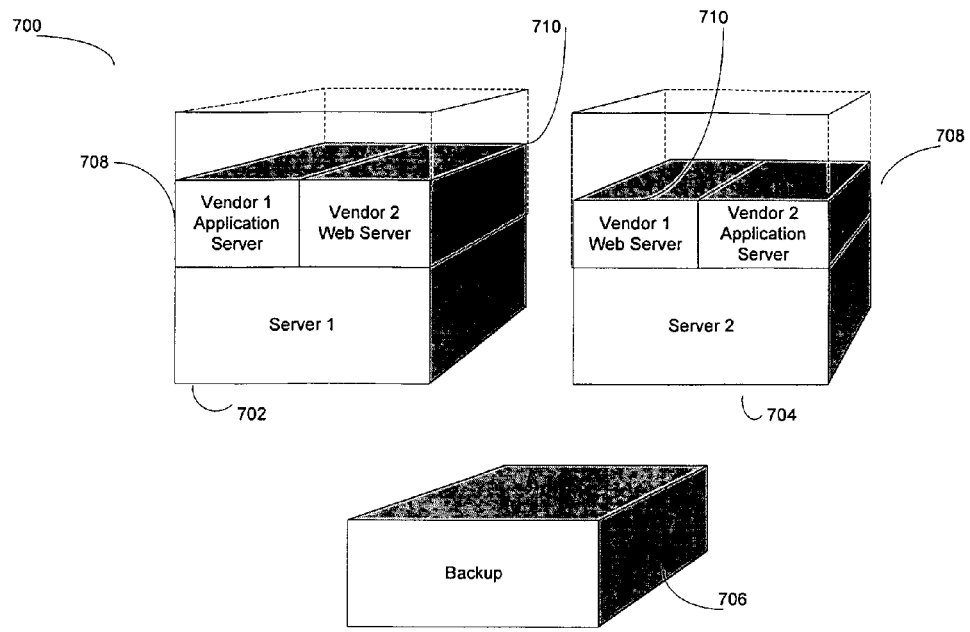
FIGS. 7A and 7B illustrate a second computing resources allocation feature provided by the e-commerce hosting system of FIGS. 1 and 2, according to an illustrative embodiment of the invention.
Figure 7B:
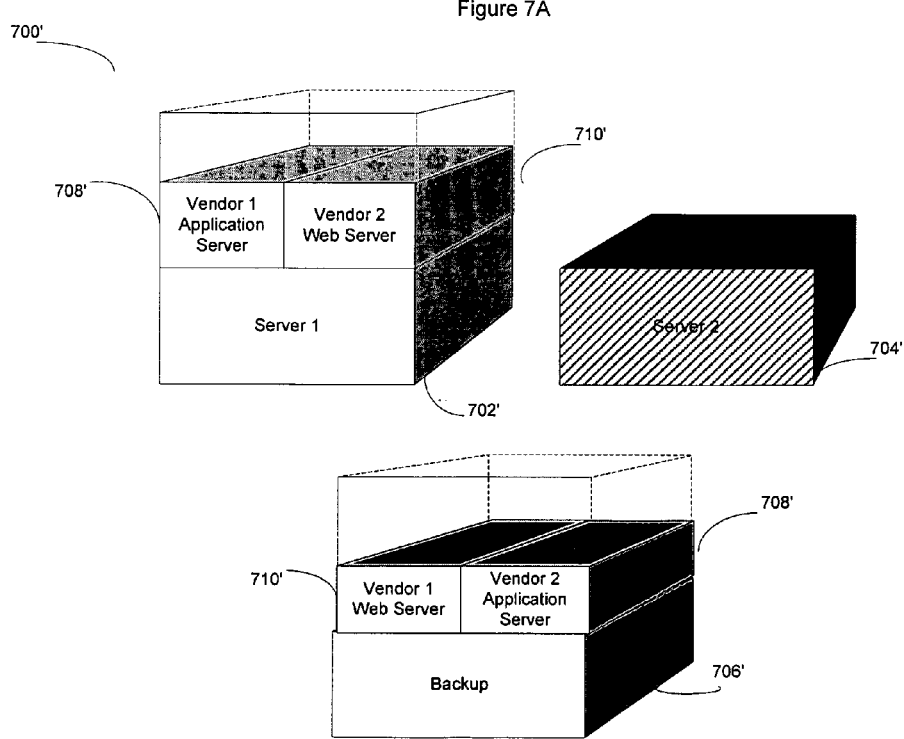

Also referring to FIG. 2, FIGS. 7A-7B provide a conceptual depiction of a second resource reallocation functionality of the e-commerce hosting system 200, according to an illustrative embodiment of the invention. FIG. 7A depicts a first resource allocation 700 among a first server 702, a second server 704, and a backup server 706. The first server 702 provides application server functionality 708 to the first vendor and web server functionality 710 to the second vendor. The second server 704 provides web server functionality 710 to the first vendor and application server functionality 708 to the second vendor. The backup sever 706 is currently offline.

FIG. 7B depicts a second resource allocation 700' among the first sever 702', the second sever 704' and the backup sever 706', resulting from the resource management module 204 detecting that the second server 704' is offline. The second sever 704' may go offline as a result of planned maintenance or as a result of technical difficulties. In response to identifying that the second server 704' is offline, the resource management module 204 reallocates the functionality previously provided by the second server 704' to the backup server 706'. Upon reactivation of the second server 704', the resource management module 204 either reallocates the computing resources being used by the backup server 706' back to the second server 704', or the resource management module 204 designates the second server 704' as a backup server, reserving its computing resources 202 until another server goes offline.

Figure 8:
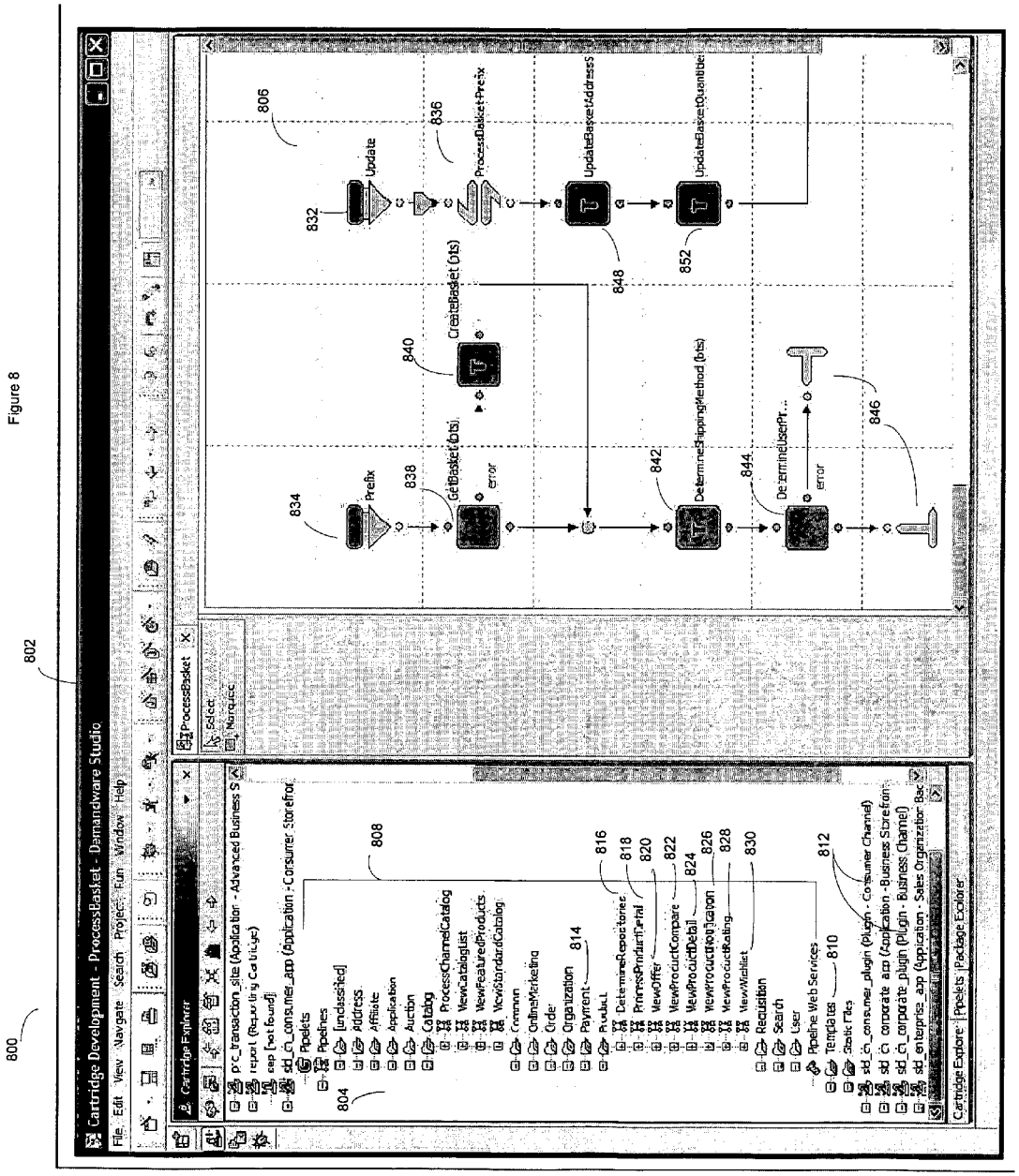
FIG. 8 is a first computer screen shot of a remotely accessible tool for modifying the business logic and graphical user interface of application instances, according to an illustrative embodiment of the invention.

FIG. 8 is a first computer screenshot 800 generated by a remote access design tool 802, such as remote access design tool 410, according to an illustrative embodiment of the invention. The remote access design tool 802 provides an integrated development environment (also known as an "integrated design environment" or "IDE") for a vendor to set up, manage, and revise the vendor's website. The remote access design tool 802 can be based for example on openly available design tools, such as the ECLIPSE™ Platform, provided by the ECLIPSE FOUNDATION, INC., a non-profit corporation based in Ottawa, Ontario, Canada. The remote access design tool 802 in the screen shot 800 is displaying two windows, a navigation window 804 and a design window 806.

The navigation window 804 gives a vendor access to the business logic and graphical user interface of the vendor's website. For example, the navigation window 804 of the screenshot 800 includes among other things, a library, such as a library 420, of business logic pipelines 808, graphical user interface templates 810, and Internet browser plug-ins 812, which the vendor has incorporated, or can incorporate into the vendor's website. The business logic pipelines 808 are organized in folders. For example, the folder corresponding to product business logic 814 includes pipelines for determining repositories 816, processing product details 818, viewing an offer 820, viewing a product comparison 822, viewing product details 824, viewing product notifications 826, viewing product ratings 828, and viewing a product wish list 830. This set of pipelines is merely illustrative. The products pipeline folder in the library may include, more, fewer, or different product business logic 814 pipelines depending on the vendor and the type of website the vendor is operating.

The design window 806 provides a work area for the vendor to create and modify the vendor's website. To add a new pipeline to the website, a vendor drags a pipeline from the navigation window 804 into the design window 806. The design window 806 is displaying two business logic pipelines 832 and 834. The website, overall, includes several other pipelines not visible on the screen.

The first business logic pipeline 832, labeled "Update," updates the contents of an e-commerce shopping basket, for example, when a customer selects a product to purchase. The pipeline 832 includes three pipelets that are visible in the design window. The first pipelet 836 calls the second pipeline 834, labeled "Prefix." The second pipeline 834 returns the current status of a shopping basket at pipelet 838 for the current session. If a shopping basket has not yet been filled during the session, pipelet 838 returns an error, resulting in pipelet 840 creating a new shopping basket for the user. Pipelet 842 requests the type of shipping the user wants. Pipelet 844 identifies the user participating in the session and attempts to return a user profile corresponding to the user from the database of the e-commerce system. After pipelet 844 completes its execution, a termination pipelet 846 is activated to end the pipeline 834, returning control of the processing back to the first pipeline 832. The remaining pipelets 848 and 850 in the first pipeline retrieve updated address information and desired product quantities from the customer, respectively.

Figure 9:
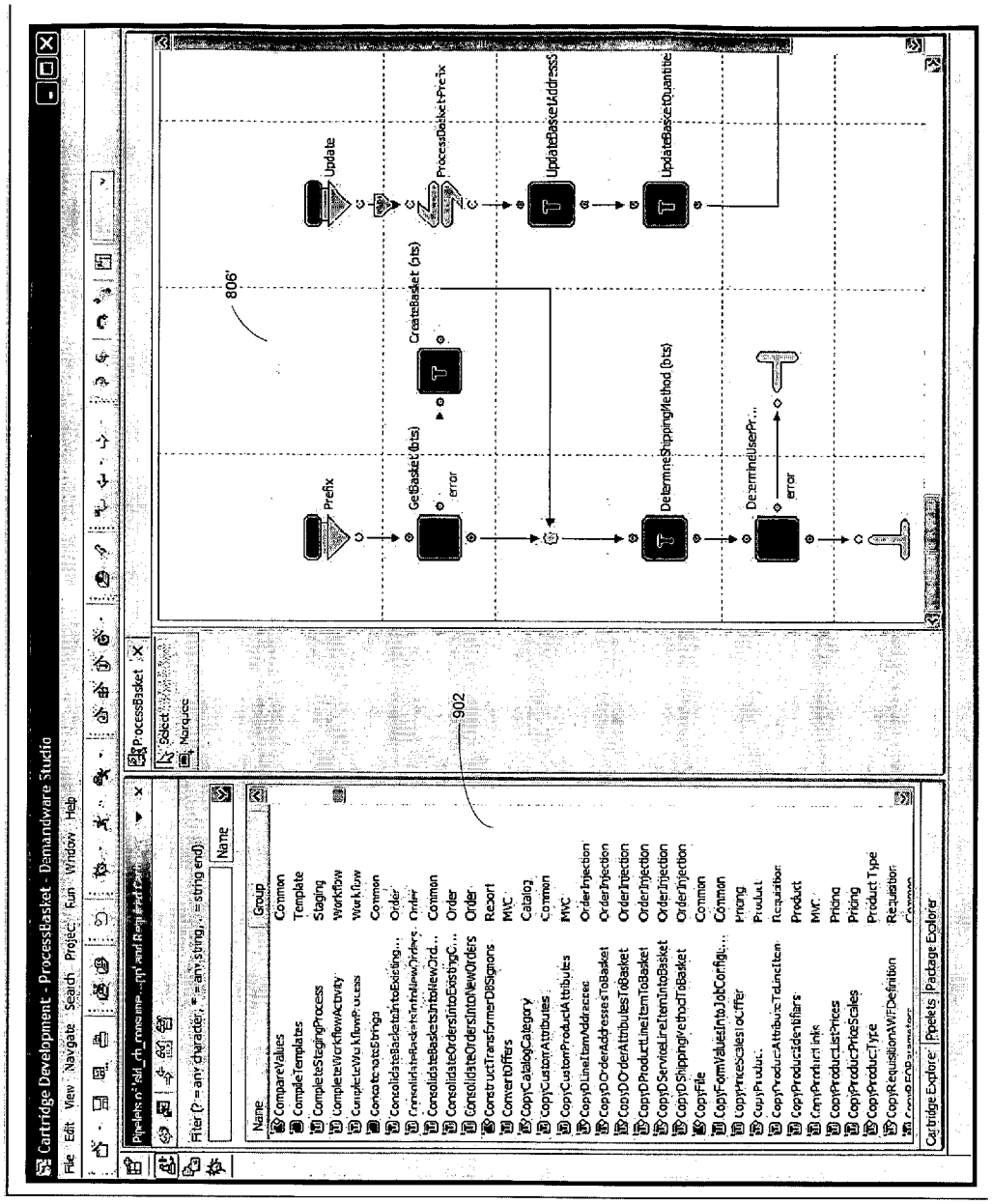
FIG. 9 is a second computer screen shot of the remotely accessible tool of FIG. 8 for modifying the business logic and graphical user interface of the application instances, according to an illustrative embodiment of the invention.

Continuing to refer to FIG. 8, FIG. 9 is a second computer screenshot 900 generated by the remote access design tool 802 of FIG. 8, according to an illustrative embodiment of the invention. The screenshot 900 includes two windows from the remote access design tool 802, a pipelet library 902 and the design window 806' of FIG. 8. To update a particular pipeline 832 or 834 in the design window, a vendor drags a pipelet from the pipelet library 902 into the design window 806' and into the proper position in the pipeline. If the vendor desires to customize a pipelet, the vendor can double-click on the pipelet to open up a customization window in which the underlying programming of the pipelet can be altered.

Figure 10:
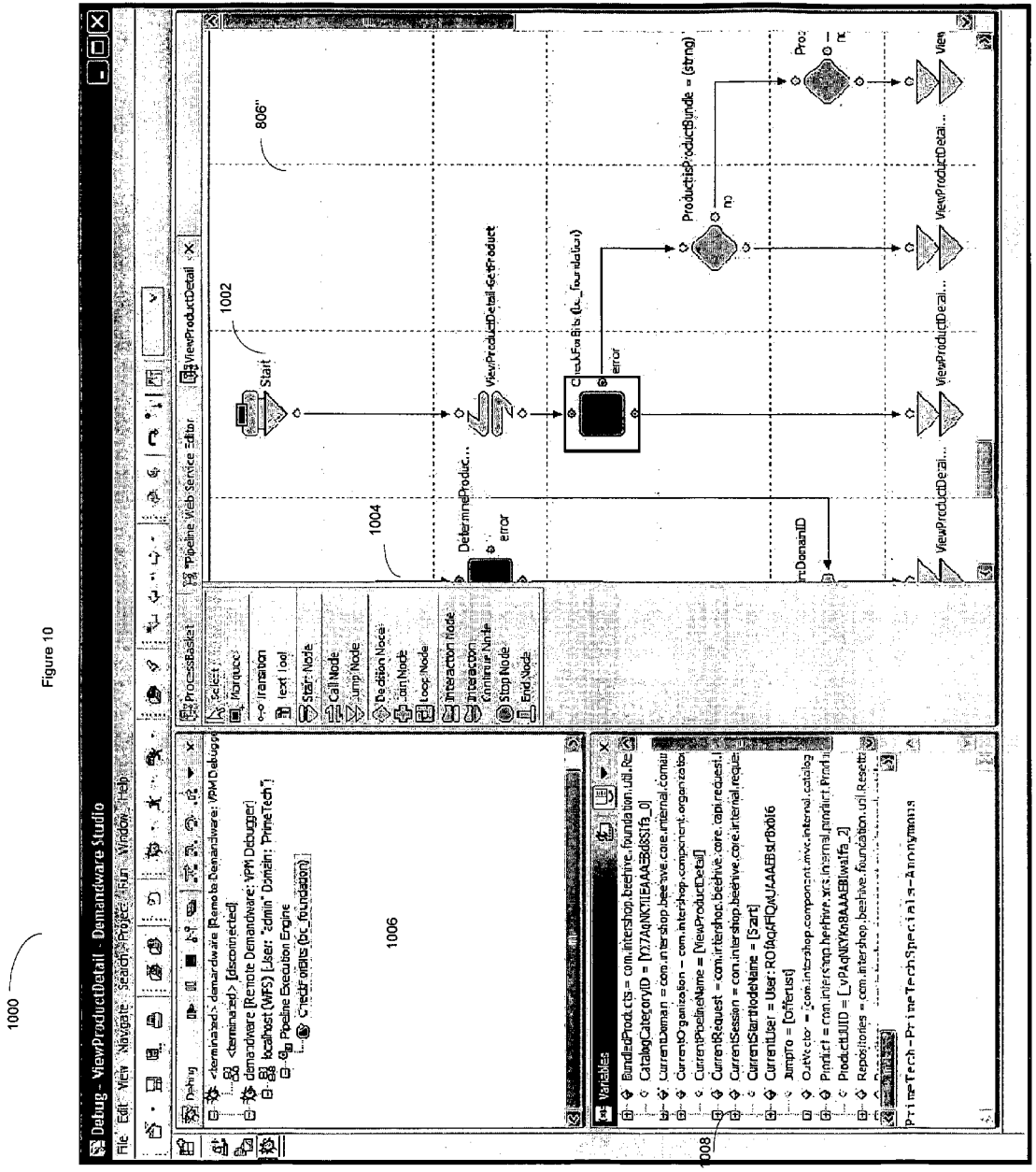
FIG. 10 is a third computer screen shot of the remotely accessible tool of FIG. 8 for modifying the business logic and graphical user interface of the application instances, according to an illustrative embodiment of the invention.

FIG. 10 is a third computer screenshot 1000 generated by the remote access design tool 802 of FIG. 8, according to an illustrative embodiment of the invention. The screenshot 1000 includes three windows, the design window 806" (displaying two different pipelines 1002 and 1004), a debugger window 1006, and a variables window 1008. The debugger window 1006, in conjunction with the variables window 1008, allows a vendor to step through the execution of one or more pipelines to identify and correct errors. The vendor can step through the execution of the pipeline, pipelet by pipelet, and monitor the resulting changes in website variables. For example, the debugger window is stepping through execution of the CheckForBits(bc_foundation) pipelet of the pipeline 1004.

Figure 11:
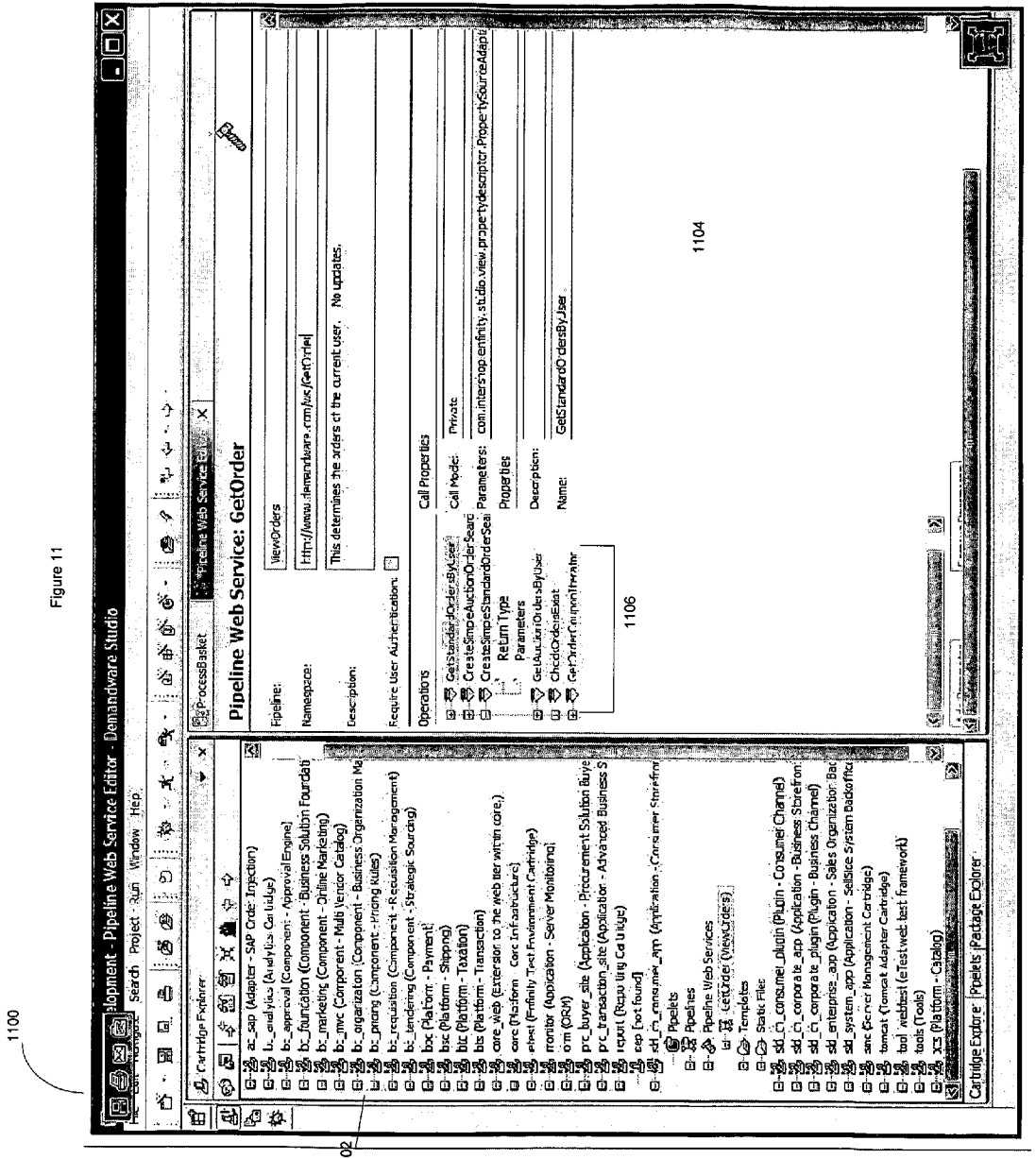
FIG. 11 is a fourth computer screen shot of the remotely accessible tool of FIG. 8 for modifying the business logic and graphical user interface of the application instances, according to an illustrative embodiment of the invention.

FIG. 11 is a fourth computer screenshot 1100 generated by the remote access design tool 802 of FIG. 8, according to an illustrative embodiment of the invention. Screenshot 1100 is displaying a navigation window 1102 and webservices configuration window 1104. As mentioned above, the business logic of a website can access functionality not provided natively on the e-commerce hosting system. Such functionality can be accessed via a webservices pipelet, which is then configured by a vendor in the webservices configuration window 1104. The vendor generates a set of operations 1106 to be carried out by the called webservice, as well as other properties. Using a webservice, a vendor can, for example and without limitation, obtain credit card authorization services from a third party, retrieve data from the inventory database or customer relations management software the vendor is executing local to the vendor's company, or retrieve banners from an advertising partner. To assist in accessing such functionality, the remote access design tool 802 includes a number of application program interfaces ("APIs") for interacting with software applications over multiple communication protocols, such as HTTP, HTTPS, and others.

The invention may be embodied in other specific forms without departing from the spirit or essential characteristics thereof. The forgoing embodiments are therefore to be considered in all respects illustrative, rather than limiting of the invention.

What is claimed is:

1. A method for providing an e-commerce hosting service comprising:
    operating a hosting system providing shared computing resources to a plurality of instances of an e-commerce application, wherein each instance has a corresponding business logic and a corresponding graphical user interface, wherein the business logic of at least one of the plurality of instances of the e-commerce application comprises a plurality of pipelines, and each pipeline is formed from a plurality of pipelets;
    providing remote access to a design tool for modifying the business logic and the graphical user interface corresponding to one of the plurality of instances;
    monitoring the demand for the shared computing resources of the plurality of instances of the e-commerce application; and
    reallocating at least a portion of the shared computing resources among the plurality of instances of the e-commerce application in response to detecting a change in demand.

2. The method of claim 1, wherein the design tool comprises an expandable library of selectable business logic components.

3. The method of claim 1, wherein at least one instance of the plurality of instances of the e-commerce application supports operation of a plurality of related e-commerce web sites.

4. The method of claim 1, comprising providing a plurality of application program interfaces for enabling at least one instance of the e-commerce application to interoperate with a business application remote from the hosting system.

5. The method of claim 1, wherein the shared computing resources comprise at least one of computer memory, processor time, storage and network bandwidth.

6. The method of claim 1, wherein the pipelets comprise modular sequences of software code.

7. The method of claim 1, wherein the design tool comprises a graphical user interface.

8. The method of claim 7, wherein the pipelets comprise modular sequences of software code, and wherein the graphical user interface of the design tool enables the modification of the business logic of at least one of the plurality of instances of the e-commerce application by the dragging and dropping of pipelets into the pipelines of the business logic of the at least one instance of the e-commerce application.

9. The method of claim 1, wherein the design tool comprises an e-commerce design tool.

10. The method of claim 1, wherein the design tool comprises an integrated development environment.

11. The method of claim 1, wherein the hosting system comprises a plurality of servers.

12. The method of claim 11, wherein each of the plurality of servers comprises computing resources and wherein the computing resources of the plurality of servers are shared among the plurality of instances of the e-commerce application.

13. The method of claim 11, wherein the plurality of servers are configured to operate as a grid.

14. The method of claim 11, comprising isolating at least one instance of the e-commerce application operating at least in part on a first server of the plurality of servers from a second instance of the plurality of instances operating at least in part on the first server.

15. The method of claim 11, wherein at least one instance of the plurality of instances of the e-commerce application utilizes the computing resources of more than one of the plurality of servers.

16. A method of providing a business software application hosting service comprising:
    operating a hosting system providing shared computing resources to a plurality of instances of a business software application, wherein each instance has a corresponding business logic and graphical user interface, and wherein the business logic of at least one of the plurality of instances of the e-commerce application comprises a plurality of pipelines, and each pipeline is formed from a plurality of pipelets;
    providing remote access to a design tool for modifying the business logic and the graphical user interface corresponding to one of the plurality of instances of the business software application;
    allocating the shared computing resources among the plurality of instances of the business software application;
    logically isolating the shared computing resources allocated to a each of the plurality of instances of the business software application from the shared computing resources allocated to a remainder of the instances of the business software application.

17. The method of claim 16, wherein the hosting system comprises a plurality of servers.

18. The method of claim 17, wherein each of the plurality of servers comprises computing resources and wherein the computing resources of the plurality of servers are shared among the plurality of instances of the business software application.

19. The method of claim 18, wherein at least one instance of the plurality of instances of the business software application utilizes the computing resources of more than one of the plurality of servers.

20. The method of claim 17, wherein the plurality of servers are configured to operate as a grid.

21. The method of claim 16, wherein the pipelets comprise modular sequences of software code.

22. The method of claim 16, wherein the design tool comprises a graphical user interface.

23. The method of claim 22, wherein the pipelets comprise modular sequences of software code, and wherein the graphical user interface of the design tool enables the modification of the business logic of at least one of the plurality of instances of the e-commerce application by the dragging and dropping of pipelets into the pipelines of the business logic of the at least one instance of the e-commerce application.

24. The method of claim 16, wherein the design tool comprises an expandable library of selectable business logic components.

25. The method of claim 16, wherein at least one instance of the plurality of instances of the business software application supports operation of a plurality of related e-commerce web sites.

26. The method of claim 16, comprising providing a plurality of application program interfaces for enabling at least one instance of the business software application to interoperate with a business application remote from the hosting system.

27. The method of claim 16, wherein the shared computing resources comprise at least one of computer memory, processor time, and network bandwidth.

28. The method of claim 16, wherein the design tool comprises an integrated development environment.

29. An e-commerce hosting system comprising:
- a plurality of servers providing shared computing resources to a plurality of instances of an e-commerce application, wherein each instance has a corresponding business logic and a corresponding graphical user interface, and wherein the business logic of at least one of the plurality of instances of the e-commerce application comprises a plurality of pipelines, and each pipeline is formed from a plurality of pipelets;
- a remotely accessible design tool for modifying the business logic and the graphical user interface corresponding to one of the plurality of instances;
- a resource management module for monitoring the demand for the shared computing resources of the plurality of instances of the e-commerce application reallocating at least a portion of the shared computing resources among the plurality of instances of the e-commerce application in response to detecting a change in demand.

30. The method of claim 14, wherein isolating the at least one application instance from the second instance comprises preventing the at least one application instance from communicating with the second application instance.

31. The method of claim 14, wherein isolating the at least one application instance from the second instance comprises preventing the at least one application instance from utilizing shared computing resources allocated to the second instance.

32. The method of claim 14, wherein isolating the at least one application instance from the second instance comprises separate virtual LAN connection between each respective instance and a user.

* * * * *

UNITED STATES PATENT AND TRADEMARK OFFICE
CERTIFICATE OF CORRECTION

| | |
|---|---|
| PATENT NO. | : 8,082,171 B1 |
| APPLICATION NO. | : 11/498592 |
| DATED | : December 20, 2011 |
| INVENTOR(S) | : Whitcomb et al. |

It is certified that error appears in the above-identified patent and that said Letters Patent is hereby corrected as shown below:

On the Title Page, Item 75, please correct the spelling of inventor Stephan Schambach's name from "Stephan Stamback" to -- Stephan Schambach --.

Signed and Sealed this
Fourteenth Day of February, 2012

David J. Kappos
*Director of the United States Patent and Trademark Office*